United States Patent
Fink

[11] 3,702,473
[45] Nov. 7, 1972

[54] SEVEN-STATE RESISTANCE SENSING SUPERVISORY SYSTEM UTILIZING SINGLE POLE-DOUBLE THROW SWITCHES

[72] Inventor: William C. Fink, Kokomo, Ind.

[73] Assignee: General Motors Corporation, Detroit, Mich.

[22] Filed: Aug. 27, 1971

[21] Appl. No.: 175,570

[52] U.S. Cl............340/409, 340/172, 340/177 R, 340/177 VA, 340/182, 340/188 R, 340/412
[51] Int. Cl..................................................G08b 1/08
[58] Field of Search ...340/409, 177 R, 177 VA, 182, 340/188 R, 188 CH, 161, 172, 412

[56] References Cited

UNITED STATES PATENTS

| | | | |
|---|---|---|---|
| 2,423,649 | 7/1947 | Horvitch | 340/274 X |
| 2,957,160 | 10/1960 | Taganyi et al. | 340/188 R X |
| 3,412,391 | 11/1968 | Ward | 340/177 R X |
| 3,513,460 | 5/1970 | Field | 340/177 R |
| 3,588,890 | 6/1971 | Cox | 340/409 |
| 3,646,552 | 2/1972 | Fuhr | 340/409 |

*Primary Examiner*—David L. Trafton
*Attorney*—E. W. Christen et al.

[57] ABSTRACT

A supervisory circuit is located at a remote station which is to be monitored from a central station. The supervisory circuit includes first and second sensing switches each operable between a first position and a second position. In addition, the supervisory circuit includes first, second and third sensing resistors interconnected with the first and second sensing switches. A pair of sensing conductors connects the supervisory circuit from the remote station to the central station where a signal resistance is presented between the sensing conductors. The signal resistance indicates the state of the supervisory circuit by assuming one of seven different values each corresponding to a different one of seven possible states of the supervisory circuit.

3 Claims, 3 Drawing Figures

INVENTOR
William C. Fink
BY
J. G. Jagodzinski
ATTORNEY

SEVEN-STATE RESISTANCE SENSING SUPERVISORY SYSTEM UTILIZING SINGLE POLE-DOUBLE THROW SWITCHES

This invention relates to a supervisory system for monitoring a plurality of remote stations from a central station located away from the remote stations. More particularly, the invention relates to a supervisory system for monitoring seven possible states which may exist at each of the remote stations.

According to one aspect of the invention, a plurality of supervisory circuits are each located at a different associated one of the remote stations to be monitored. The supervisory circuits each include first and second sensing switches. The first and second sensing switches each have a common terminal and first and second switching terminals. Further, the first and second sensing switches are each operable between a first position in which the common terminal is connected to the first switching terminal and a second position in which the common terminal is connected to the second switching terminal. In addition, the supervisory circuits each include first, second and third sensing resistors. The first sensing resistor is connected between the first switching terminal of the first sensing switch and the first switching terminal of the second sensing switch. The second sensing resistor is connected between the first switching terminal of the second sensing switch and the second switching terminal of the first sensing switch. The third sensing resistor is connected between the second switching terminal of the first sensing switch and the second switching terminal of the second sensing switch. As a result, four different values of resistance are developed between the common terminals of the first and second sensing switches each corresponding to a different one of four possible states which may exist at each of the supervisory circuits as defined by the relative positions of the first and second sensing switches.

In another aspect of the invention, a plurality of pairs of sensing conductors each connect the common terminals of the first and second sensing switches in a different associated one of the supervisory circuits to the central station where a signal resistance is presented between the conductors. The signal resistance assumes one of seven different values each corresponding to a different one of seven possible states which may exist in each of the supervisory circuits. First, both the first and second sensing switches may be in the first position. Second, both the first and second sensing switches may be in the second position. Third, the first sensing switch may be in the first position and the second sensing switch may be in the second position. Fourth, the first sensing switch may be in the second position and the second sensing switch may be in the first position. Fifth, one of the sensing conductors may be grounded. Sixth, one of the sensing conductors may be open circuited. Seventh, the sensing conductors may be short circuited together.

As contemplated, by a further aspect of the invention, a plurality of monitoring circuits are provided at the central station. The monitoring circuits each include a voltage divider network having at least first and second detecting resistors. The pairs of sensing conductors each connect the associated one of the supervisory circuits across the first detecting resistor of a different associated one of the monitoring circuits thereby to establish a signal voltage across the second detecting resistor. The signal voltage assumes one of seven different levels each corresponding to a different one of the seven possible states which may exist in each of the supervisory circuits.

In another aspect of the invention, a control circuit is located at the central station and is connected to each of the monitoring circuits. Within the control circuit, an address device sequentially samples the signal voltage produced by each of the monitoring circuits. A voltage generator develops a reference voltage having a unidirectionally varying voltage level. A comparator provides an output signal when the level of the reference voltage exceeds the level of the signal voltage. An indicator device senses the level of the reference voltage at the time an output signal is produced by the comparator. Hence, the control circuit successively determines the condition of each of the supervisory circuits located at the remote stations.

These and other aspects of the invention will become more apparent by reference to the following detailed description of a preferred embodiment when considered in conjunction with the accompanying drawing:

Figure 1:
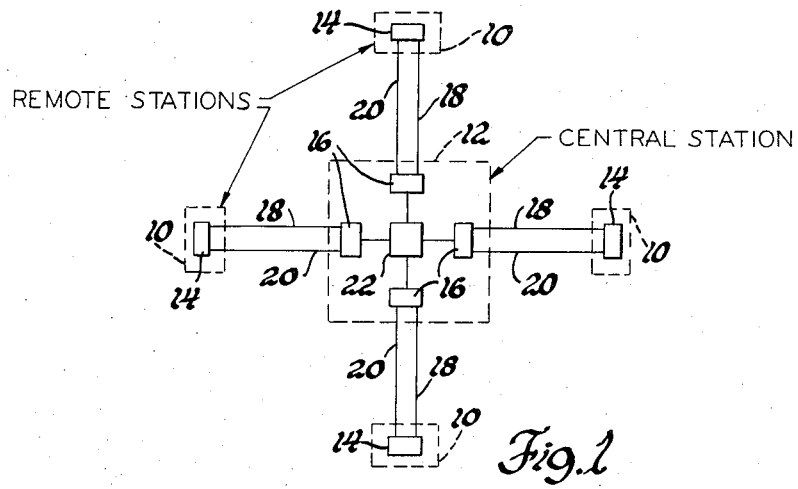
FIG. 1 is a schematic diagram of a supervisory system incorporating the principles of the invention.

FIG. 1 discloses a supervisory system for monitoring a plurality of remote stations 10 from a central station 12 located away from the remote stations 10. A plurality of supervisory circuits 14 are each located at a different associated one of the remote stations 10. A plurality of monitoring circuits 16 are each located at the central station 12. A plurality of pairs of conductors 18 and 20 each connect a different associated one of the supervisory circuits 14 with a different associated one of the monitoring circuits 16. A control circuit 22 is located at the central station 12 and is connected to each of the monitoring circuits 16. The control circuit 22 successively senses and records the state of each of the supervisory circuits 14 as detected by the associated ones of the monitoring circuits 16. It will be readily apparent that the illustrated supervisory system may employ as many supervisory circuits 14 and monitoring circuits 16 as there are remote stations 10 to be monitored.

Figure 2:
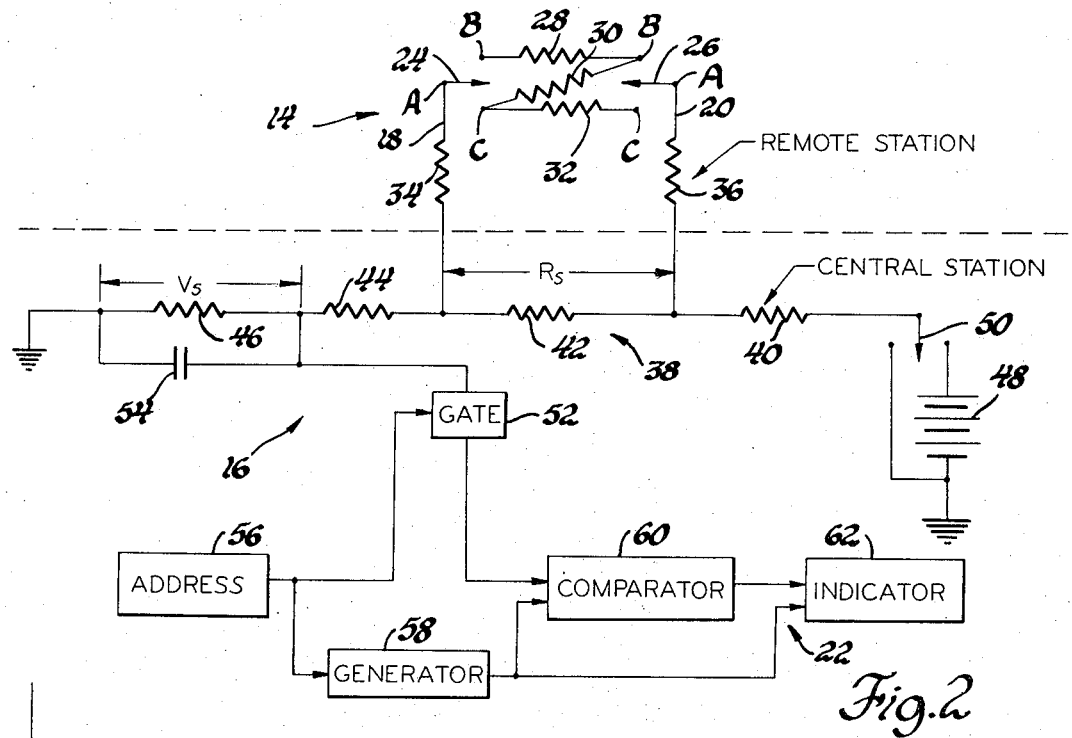
FIG. 2 is a schematic diagram of a portion of the supervisory system illustrated in FIG. 1.

FIG. 2 discloses a portion of the supervisory system illustrated in FIG. 1 including a supervisory circuit 14 connected to a monitoring circuit 16 by a pair of sensing conductors 18 and 20. The supervisory circuit 14 includes first and second sensing switches 24 and 26 each including a common terminal A, a first switching terminal B, and a second switching terminal C. The first and second sensing switches 24 and 26 are each operable between a first position and a second position in response to the occurrence of some supervised event. In the first position of the sensing switches 24 and 26, the common terminal A is connected to the first switching terminal B. Conversely, in the second position of the sensing switches 24 and 26, the common terminal A is connected to the second switching terminal C. The supervised event may be any phenomena capable of being represented by the relative position of the sensing switches 24 and 26. As an example, the first sensing switch 24 may be automatically operated by a fire detection device while the second sensing switch 26 may be manually operated by security personnel on normal patrol duty.

The supervisory circuit 14 further includes first, second and third sensing resistors 28, 30 and 32. The first sensing resistor 28 is connected between the first switching terminal B of the first sensing switch 24 and the first switching terminal B of the second sensing switch 26. The second sensing resistor 30 is connected between the first switching terminal B of the second sensing switch 26 and the second switching terminal C of the first sensing switch 24. The third sensing resistor 32 is connected between the second switching terminal C of the first sensing switch 24 and the second switching terminal C of the second sensing switch 26.

The first sensing resistor 28 provides a resistance $R_{28}$. The second sensing resistor 30 provides a resistance $R_{30}$. The third sensing resistor 32 provides a sensing resistance $R_{32}$. For demonstration purposes, it is assumed that the resistance $R_{28}$ of the first sensing resistor 28 is greater than the resistance $R_{30}$ of the second sensing resistor 30 which is greater than the resistance $R_{32}$ of the third sensing resistor 32. In addition, the sensing conductor 18 provides a line resistance $R_{34}$ represented by the resistor 34. Similarly, the sensing conductor 20 provides a line resistance $R_{36}$ represented by resistor 36. As a result, a signal resistance $R_s$ is developed between the sensing conductors 18 and 20 at the central station 12.

The signal resistance $R_s$ appearing across the sensing conductors 18 and 20 assumes one of seven different resistance values depending upon the state of the supervisory circuit 14. If both the first and second sensing switches 24 and 26 are in the first position, the signal resistance $R_s$ is given by the following expression:

$$R_s = R_{28} + (R_{34} + R_{36}) \quad 1.$$

If the first sensing switch 24 is in the second position and the second sensing switch 26 is in the first position, the signal resistance $R_s$ is given by the following expression:

$$R_s = R_{30} + (R_{34} + R_{36}) \quad 2.$$

If both the first and second sensing switches 24 and 26 are in the second position, the signal resistance $R_s$ is given by the following expression:

$$R_s = R_{32} + (R_{34} + R_{36}) \quad 3.$$

If the first sensing switch 24 is in the first position and the second sensing switch 26 is in the second position, the signal resistance $R_s$ is given by the following expression:

$$R_s = R_{28} + R_{30} + R_{32} + (R_{34} + R_{36}) \quad 4.$$

If one of the pair of sensing conductors 18 and 20 is grounded, the signal resistance $R_s$ is given by the following expression:

$$R_s \approx 0 \quad 5.$$

If one of the pair of sensing conductors 18 and 20 is open circuited, the signal resistance $R_s$ is given by the following expression:

$$R_s = \infty \quad 6.$$

Finally, if the pair of sensing conductors 18 and 20 are short circuited together, the signal resistance $R_s$ is given by the following expression:

$$R_s = R_{42} + R_{44} \quad 7.$$

Some advantageous characteristics of the supervisory circuit 14 will now be apparent from inspection of the above expressions 1 – 7. First, the signal resistance $R_s$ varies over a relatively large range of values, as given by the expressions 1 – 4, in response to operation of the first and second sensing switches 24 and 26. Second, the first, second and third sensing resistors 28, 30 and 32 may be completely independently selected to provide for a relatively uniform spacing between the values of the signal resistance $R_s$ given by the expressions 1 – 4. Third, the first and second sensing switches 24 and 26 may be provided by simple double pole-single throw switches.

The monitoring circuit 16 includes a voltage divider network 38 provided by first, second, third and fourth detecting resistors 40, 42, 44 and 46 connected in series between a suitable voltage source 48 and ground through a control switch 50. Preferably, the control switch 50 is a double pole-single throw switch operable between first and second positions, much like the first and second sensing switches 24 and 26. When the control switch 50 is in the first position, the voltage divider network 38 is effectively connected to the voltage source 48. When the control switch 50 is in the second position, the voltage divider network 48 is effectively connected to ground. The voltage source 48 may be conveniently provided by a conventional battery. The control switch 50 may be a manually operable mechanical switch or an automatically operable electronic switch.

The conductors 18 and 20 connect the supervisory circuit 14 across the detecting resistor 42 thereby establishing a signal voltage $V_s$ across the detecting resistor 46. Assuming the control switch 50 is in the first position to connect the voltage divider network 38 to the voltage source 48, the level of the signal voltage $V_s$ appearing across the detecting resistor 46 is an inverse function of the value of the signal resistance $R_s$ appearing between the sensing conductors 18 and 20. Thus, the level of the signal voltage $V_s$ is responsive to the state of the supervisory circuit 14. More specifically, the signal voltage $V_s$ assumes one of seven different levels $L_1$–$L_7$ each corresponding to a different one of the values of the signal resistance $R_s$ given by the expressions 1 – 7.

Figure 3:
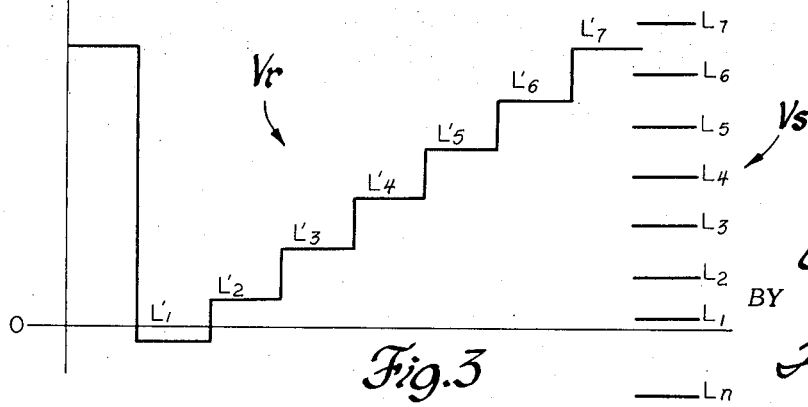
FIG. 3 is a graph of several voltage levels useful in explaining the operation of the supervisory system illustrated in FIGS. 1 and 2.

FIG. 3 illustrates the relative levels $L_1$–$L_7$ of the signal voltage $V_s$ each corresponding to a different one of the seven states of interest which may exist in the supervisory circuit 14. Hence, the signal voltage $V_s$ is at a first level $L_1$ when one of the sensing conductors 18 and 20 is grounded. The signal voltage $V_s$ is at a second higher level $L_2$ when one of the pair of sensing conductors 18 and 20 is open circuited. The signal voltage $V_s$ is at a third higher level $L_3$ when the first sensing 130 switch 24 is in the first position and the second sensing switch 26 is in the second position. The signal voltage $V_s$ is at a fourth higher level $L_4$ when both the first and second sensing switches 24 and 26 are in the first position. The signal voltage $V_s$ is at a fifth higher level $L_5$ when the first sensing switch 24 is in the first position and the second sensing switch 26 is in the second position. The signal voltage $V_s$ is at a sixth higher level $L_6$ when both the first and second sensing switches 24 and 26 are in the second position. Finally, the signal voltage $V_s$ is at a seventh higher level $L_7$ when the pair of conductors 18 and 20 are short circuited together. The first level $L_1$ of the signal voltage $V_s$ is slightly higher than ground potential due to the small amount of voltage drop provided by the conductors 18 and 20 even when grounded. Further, the relative relationship between the levels $L_3$–$L_6$ is based upon the assumption that the resistance $R_{28}$ of the first sensing resistor 28 is greater than the resistance $R_{30}$ of the second sensing resistor 30 which is greater than the resistance $R_{32}$ of the third sensing resistor 32.

Referring again to FIG. 2, the monitoring circuit 16 further includes a gate 52 which is connected between the detecting resistors 44 and 46 to receive the signal voltage $V_s$. A capacitor 54 is connected across the detecting resistor 46 to provide an RC filter. The capacitor 54 shunts high frequency noise to ground around the detecting resistor 46 thereby prohibiting the noise from influencing the level of the signal voltage $V_s$ appearing across the resistor 46. The detecting resistor 40 provides a resistance for the voltage source 48 if the conductor 20 is grounded. The detecting resistor 44 restricts the level of the signal voltage $V_s$ to a range suitable for utilization by the control circuit 22.

The control circuit 22 includes an address device 56 connected to the gate 52 and to a voltage generator 58. Simultaneously, the address device 56 activates the gate 52 to apply the signal voltage $V_s$ from the monitoring circuit 16 to the control circuit 22 and energizes the voltage generator 58 to initiate a staircase reference voltage $V_r$ as shown in FIG. 3. The reference voltage $v_r$ includes successively higher voltage levels $L'_1$–$L'_7$. A comparator 60 is connected to the gate 52 to receive the signal voltage $V_s$ and is connected to the voltage generator 58 to receive the reference voltage $V_r$. The comparator 60 produces an output signal when the level of the reference voltage $V_r$ which successively assumes each of the levels $L'_1$–$L'_7$ exceeds the level of the signal voltage $V_s$ which continuously assumes one of the levels $L_1$–$L_7$ depending upon the state of the supervisory circuit 14. An indicator device 62 is connected to the comparator 60 to receive the output signal and is connected to the voltage generator 58 to receive the reference voltage $V_r$. The indicator device 62 senses and records the instantaneous level of the reference voltage $V_r$ from among the levels $L'_1$–$L'_7$ when an output signal is received from the voltage comparator 60.

It will now be appreciated that the level of the reference voltage $V_r$ sensed by the indicator device 62 represents the state of the supervisory circuit 14. For example, if both the first and second sensing switches 24 and 26 in the supervisory circuit 14 are in the first position, the signal voltage $V_s$ developed across the detecting resistor 46 in the monitoring circuit 16 is at the level $L_4$. Thus, the comparator 60 provides an output signal when the reference voltage $V_r$ reaches the level $L'_5$ which is greater than the level $L_4$ of the signal voltage $V_s$. As a result, the indicator 62 senses and records the level $L'_5$ of the reference voltage $V_r$ in response to the occurrence of an output signal from the comparator 60 thereby indicating that both the first and second sensing switches 24 and 26 in the supervisory circuit 14 are in the first position. It will now be apparent that the reference voltage $V_r$ need not be a staircase voltage but may be any suitable voltage having a unidirectionally varying amplitude.

In a supervisory system having a plurality of supervisory circuits 14 and associated monitoring circuits 16, the address device 56 is connected to each of the gates 52 in the monitoring circuits 16 to sequentially activate the gates 52. Thus, the indicator device 62 senses and records the condition of each of the supervisory circuits 14 as each of the gates 52 in the associated monitoring circuits 16 are sequentially activated by the address device 56.

Ordinarily, the supervisory circuit 14 is in the normal state when both the first and second sensing switches 24 and 26 are in the first position. With the supervisory circuit 14 in the normal state, a predetermined normal voltage is developed between the conductors 18 and 20 across the detecting resistor 42 in the monitoring circuit 16. Under the influence of the normal voltage, the potential of the conductor 20 is higher than the potential of the conductor 18. In other words, the conductor 20 is positive with respect to the conductor 18. Since the conductors 18 and 20 extend from the remote station 10 to the central station 12, it is possible to externally apply an unauthorized voltage across the conductors 18 and 20. If the magnitude of the unauthorized voltage is equal to the magnitude of the normal voltage, the supervisory circuit 14 is effectively disabled. That is, the operation of the first and second sensing switches 24 and 26 in the supervisory circuit 14 is undetected by the monitoring circuit 16.

In order to detect the application of an unauthorized voltage across the conductors 18 and 20, the control switch 58 is placed in the second position to effectively connect the voltage divider network 38 to ground. In this condition, the level of the signal voltage $V_s$ developed across the detecting resistor 46 is at the ground potential in the absence of the application of an unauthorized voltage between the conductors 18 and 20. However, if an unauthorized voltage is applied between the conductors 18 and 20, the level of the signal voltage $V_s$ is other than at the ground potential. Since the conductor 18 is negative with respect to the conductor 20, the signal voltage $V_s$ assumes a level $L_n$ below the ground potential when an unauthorized voltage is applied between the conductors 18 and 20 and the control switch 50 is in the second position. The level $L_n$ is below the ground potential to the same extent that the level $L_4$ is above the ground potential.

The level $L'_1$ of the reference voltage $V_r$ is slightly below ground. Accordingly, when an unauthorized voltage is not applied between the conductors 18 and 20, the indicator device 62 produces a response indicating that one of the conductors 18 and 20 is grounded. This indication is expected since the control switch 50 is in the second position. Conversely, when an unauthorized voltage is applied across the conductors 18 and 20, the comparator 60 continuously produces an output signal since the level $L'_1$ of the reference voltage $V_r$ is always above the level $L_n$ of the signal voltage $V_s$. This indicates the presence of an unauthorized voltage across the conductors 18 and 20.

If any of the system components of the supervisory circuit 14, the monitoring circuit 16 or the control circuit 22 should fail, the comparator 60 will necessarily either continuously produce an output signal or continuously not produce an output signal. As a result, the indicator device 62 will interpret the performance of the comparator 60 as indicative of either the grounding of one of the conductors 18 and 20 or the application of an unauthorized voltage between the conductors 18 and 20. Thus, the indicator device 62 yields a fault indication in response to the failure of any of the system components.

It is to be understood that the illustrated embodiment of the invention is shown for demonstrative purposes only and that various alterations and modifications may be made to the illustrated embodiment without departing from the spirit and scope of the invention. Hence, the illustrated control circuit 22 may take any of a variety of configurations well known to those skilled in the art. Ordinarily, the exact configuration of the control circuit 22 will be determined by the precise requirements of each particular application.

In the illustrated control circuit 22, the gate 52 and the address device 56 may be provided by suitable logic elements well known to those skilled in the art. The voltage generator 58 may be provided by any conventional staircase function generator. The comparator 60 may conveniently take the form of a conventional differential amplifier. Further, the indicator device 62 may be provided by any suitable apparatus capable of indicating the level of the reference voltage $V_r$ at the time an output signal is received from the comparator 60.

What is claimed is:

1. A supervisory system for monitoring a remote station from a central station located away from the remote station, comprising: a supervisory circuit located at the remote station, the supervisory circuit including first and second switching devices each having a common terminal and first and second switching terminals, and each operable between a first position in which the common terminal is connected to the first switching terminal and a second position in which the common terminal is connected to the second switching terminal, a first resistance device connected between the first switching terminal of the first switching device and the first switching terminal of the second switching device, a second resistance device connected between the first switching terminal of the second switching device and the second switching terminal of the first switching device, and a third resistance device connected between the second switching terminal of the first switching device and the second switching terminal of the second switching device; a pair of conductors each connected to a different one of the common terminals of the first and second switching devices and each extending to the central station for providing a signal resistance between the conductors at the central station, the signal resistance assuming one of seven different resistance values each corresponding to a different one of seven possible states which may exist in each of the supervisory circuits defined when both the first and second switching devices are in the first position, when both the first and second switching devices are in the second position, when the first switching device is in the first position and the second switching device is in the second position, when the first switching device is in the second position and the second switching device is in the first position, when one of the conductors is grounded, when one of the conductors is open circuited, and when the conductors are short circuited together; and means located at the central station and connected to the pair of conductors for indicating the state of the supervisory circuit in response to the value of the signal resistance.

2. A supervisory system for monitoring a plurality of remote stations from a central station located away from the remote stations, comprising: a plurality of supervisory circuits each located at a different associated one of the remote stations, the supervisory circuits each including first and second sensing switches each having a common terminal and first and second switching terminals and each operable between a first position in which the common terminal is connected to the first switching terminal and a second position in which the common terminal is connected to the second switching terminal, a first sensing resistor connected between the first switching terminal of the first sensing switch and the first switching terminal of the second sensing switch, a second sensing resistor connected between the first switching terminal of the second sensing switch and the second switching terminal of the first sensing switch, and a third sensing resistor connected between the second switching terminal of the first sensing switch and the second switching terminal of the second sensing switch; a plurality of monitoring circuits each located at the central station, the monitoring circuits each including a voltage divider network having at least first and second detecting resistors; a plurality of different pairs of sensing conductors each connecting the common terminals of the first and second sensing switches in a different one of the supervisory circuits across the first detecting resistor of a different associated one of the monitoring circuits thereby to establish a signal voltage across the second detecting resistor, the signal voltage assuming one of seven different voltage levels each corresponding to a different one of seven possible states which may exist in each of the supervisory circuits as defined when both the first and second sensing switches are in the first position, when both the first and second sensing switches are in the second position, when the first sensing switch is in the first position and the second sensing switch is in the second position, when the first sensing switch is in the second position and the second sensing switch is in the first position, when one of the sensing conductors is grounded, when one of the sensing conductors is open circuited, and when the sensing conductors are short circuited together; and a control circuit located at the central station and connected to each of the monitoring circuits for indicating the state of each of the supervisory circuits located at the remote stations in response to the level of the signal voltage provided by each of the monitoring circuits.

3. A supervisory system for monitoring a plurality of remote stations from a central station located away from the remote stations, comprising: a plurality of supervisory circuits each located at a different one of the remote stations, the supervisory circuits each including first and second sensing switches each having a common terminal and first and second switching terminals and each operable between a first position in which the common terminal is connected to the first switching terminal and a second position in which the common terminal is connected to the second switching terminal, a first sensing resistor connected between the first switching terminal of the first sensing switch and the first switching terminal of the second sensing switch, a second sensing resistor connected between the first switching terminal of the second sensing switch and the second switching terminal of the first sensing switch, and a third sensing resistor connected between the second switching terminal of the first sensing switch and the second switching terminal of the second sensing switch; a plurality of monitoring circuits each located at the central station, the monitoring circuits each including a voltage divider network having at least first and second detecting resistors; a plurality of different pairs of sensing conductors each connecting the common terminals of the first and second sensing switches in a different associated one of the supervisory circuits across the first detecting resistor of a different associated one of the monitoring circuits thereby to establish a signal voltage across the second detecting resistor, the signal voltage having a first level when one of the sensing conductors is grounded, a second greater level when one of the sensing conductors is open circuited, a third greater level when both the first and second sensing switches are in the first position, a fourth greater level when the first sensing switch is in the second position and the second sensing switch is in the first position, a fifth greater level when both the first and second sensing switches are in the second position, a sixth greater level when the first sensing switch is in the first position and the second sensing switch is in the second position, and a seventh greater level when the sensing conductors are short circuited together, a plurality of gates each connected with the first detecting resistor in a different associated one of the monitoring circuits for passing the signal voltage when activated, and a control circuit located at the central station, the control circuit including generator means for producing a reference voltage having a unidirectionally varying level when energized, address means connected to each of the gates in the monitoring circuits and to the generator means for successively activating each of the gates and simultaneously energizing the generator means, comparator means connected to each of the gates in the monitoring circuits and connected to the generator means for producing an input signal when the level of the reference voltage exceeds the level of the signal voltage, and indicator means connected to the comparator means and to the generator means for sensing and recording the level of the reference voltage in response to the occurrence of an output signal thereby to successively indicate the state of each of the supervisory circuits located at the remote stations.

* * * * *